March 29, 1949.  L. J. DAOUST  2,465,791
SLIDE CALIPER
Filed May 14, 1945
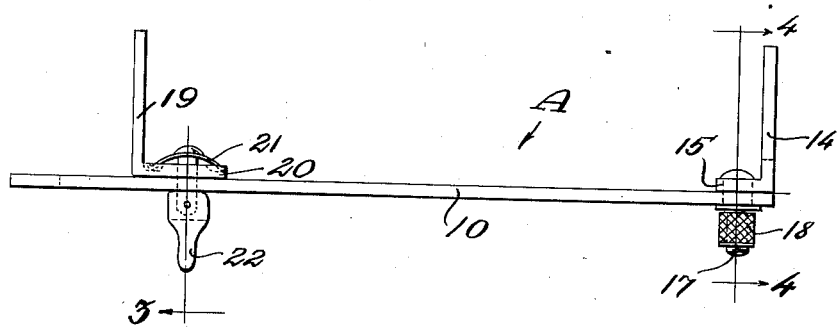
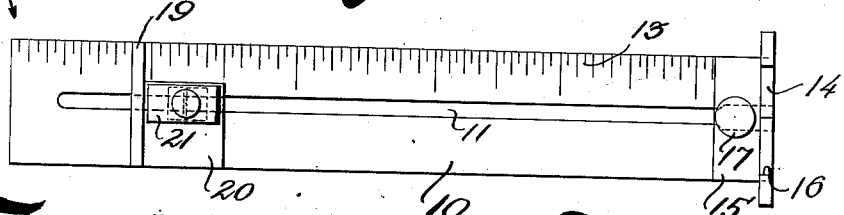
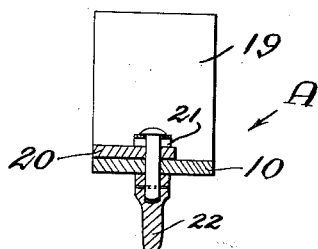
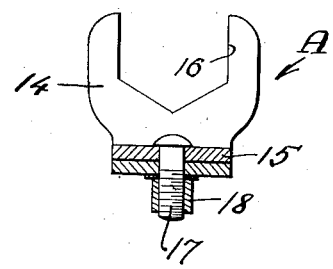
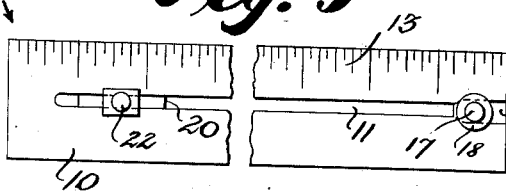
INVENTOR.
Leo J. Daoust
BY Victor J. Evans & Co.
ATTORNEYS Patented Mar. 29, 1949

2,465,791

UNITED STATES PATENT OFFICE 2,465,791

SLIDE CALIPER

Leo J. Daoust, Milwaukee, Wis.

Application May 14, 1945, Serial No. 593,551

1 Claim. (Cl. 33—143)

The invention relates to a tool gauge, and more especially to an adjustable rule for a machinist's use.

The primary object of the invention is the provision of a device or instrument of this character, whereby tools, such as drills, reamers, taps, etc., in multiple automatic screw machines or other machines, where such tools have been taken out, sharpened and replaced in the same position, can be accurately measured, in this manner eliminating guess-work in this connection, as is required in the use of other measuring equipment employed for a similar purpose.

Another object of the invention is the provision of a device or instrument of this character, wherein its construction permits measurements to be taken accurately in places difficult to get to, the device being controllable by the use of one hand in its handling, and novel and unique, in that it is compact and handy of application.

A further object of the invention is the provision of a device or instrument of this character, which is simple in construction, thoroughly reliable and efficient in the use thereof, strong, durable, easy to read, readily and conveniently adjustable, and inexpensive to manufacture.

With these and other objects in view, the invention consists in the features of construction, combination and arrangement of parts as will be hereinafter more fully described, illustrated in the accompanying drawing, which shows the preferred embodiment of the invention, and pointed out in the claim hereunto appended.

In the accompanying drawing:

Figure 1 is a side view of the device or instrument constructed in accordance with the invention.

Figure 2 is a plan view thereof.

Figure 3 is a sectional view taken on the line 3—3 of Figure 1 looking in the direction of the arrows.

Figure 4 is a sectional view taken on the line 4—4 of Figure 1 looking in the direction of the arrows.

Figure 5 is a plan view looking toward the other side than that shown in Figure 2.

Similar reference characters indicate corresponding parts throughout the several views in the drawing.

Referring to the drawing in detail, A designates generally the device or instrument constructed in accordance with the invention and in its entirety. The device or instrument A comprises a flat-faced rule blade or beam 10, which can be of any determined length, and uniform in thickness and width throughout the extent thereof, with blunt opposite ends.

The blade or beam 10 has formed at its longitudinal center an elongated slot 11 which opens through one of the blunt ends, this open end 12 of the slot being slightly wider than the remainder of the same. Opposite side faces of the blade or beam 10 have indicated thereon graduated linear scale marks 13 meeting one side edge of the said blade or beam.

Adapted for fitting upon either side face of the blade or beam 10, which is reversible, is a tool applicator head 14, which is formed with an attaching ear 15 at substantially right angles thereto, and an open tool or bushing jaw formation 16 in the said head. The ear 15 accommodates a binding screw 17 which has a portion of its shank conforming to the end 12 of the slot 11 to snugly fit the same, and carries a knurled tightening nut 18, so that the head can be securely attached in place on the blade or beam 10, as will be best seen in Figures 1 and 4 of the drawing. The jaw formation 16 accommodates the tool or tool and bushing to be measured when installed in the machine for the operation thereof.

The blade or beam 10 also supports for cooperation with the head 14 and the scale marking 13 an indicator or gauge wing or block 19, which is formed with a base ear 20, of a width to ride on only a portion of the width of the said blade or block lying at one side of the slot 11 therein, and also over the latter, so as to make clearly visible the scale marking 13 opposite thereto for easy reading of the latter in the application of the device for measuring purposes of a tool and tool bushing or chuck.

Engaged in the slot 11 and the ear 20 of the wing or block 19 is a spring tensioned lever operated latching clamp 21, its lever being denoted at 22, and such clamp is for holding the wing or block 19 in an adjusted position on the blade or beam 10 for tool measuring purposes to gauge the setting thereof within the machine employing the same for operation on a piece of work.

The head and wing or block can be removed for mounting on a longer or shorter rule blade or beam constructed as before set forth, as may be required.

The device A is employed for measuring a tool as set within a machine for operating the same, and the device is adaptable to either the tool per se or the tool and its bushing or chuck. Both the head and the wing or block can be reversed on the blade or beam 10 for proper application.

What is claimed is:

An adjustable gage having in combination, an elongated flat-faced rule having a slot and scale marks along said slot, said slot having a first portion extending centrally and longitudinally of said rule to within a predetermined distance of one end of said rule thereby terminating in a closed end, said first portion at its opposite end merging into an aligned second portion having a predetermined width greater than that of said first portion and extending to the end of said rule thereby terminating in an open end, an indicator wing having a base extending normal thereto and slidably mounted on said rule, a bolt means passing through said base and through and slidable in said first portion of said slot, spring means between said bolt means and said base, a latching cam device pivoted to said bolt means and adapted to engage said rule to releasably lock said indicator wing in adjusted positions along said rule, a tool-receiving head having a base extending normal thereto and slidably mounted on said rule, a threaded bolt member passing through said tool-receiving head base and removably mounted in said second portion of said slot, a nut on said bolt member for releasably locking said tool-receiving head base to said rule.

LEO J. DAOUST.

REFERENCES CITED

The following references are of record in the file of this patent:

FOREIGN PATENTS

| Number | Country | Date |
|---|---|---|
| 137,905 | Great Britain | Jan. 29, 1920 |
| 195,551 | Germany | Feb. 21, 1908 |